B. B. Hotchkiss,
Snap Hook.
Nº 22,290.   Patented Dec. 14, 1858.
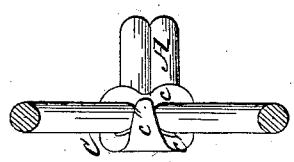
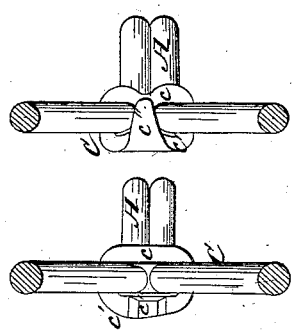
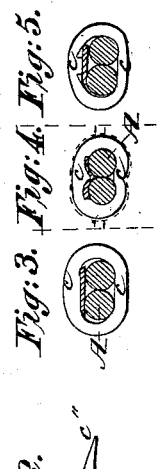
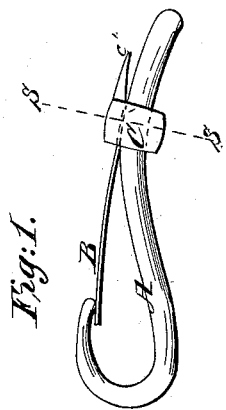
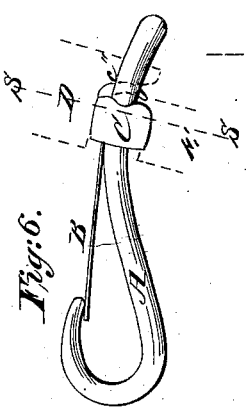
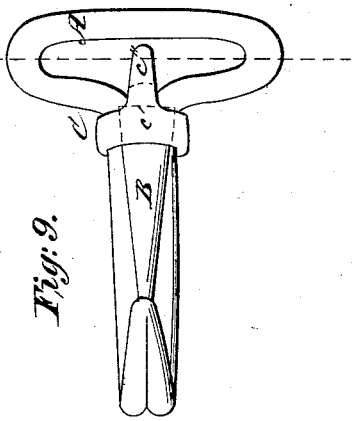
Witnesses:  Inventor:
H. T. Finch  B. B. Hotchkiss
G. J. Kelsey

UNITED STATES PATENT OFFICE.

B. B. HOTCHKISS, OF SHARON, CONNECTICUT.

HARNESS-SNAP.

Specification of Letters Patent No. 22,290, dated December 14, 1858.

*To all whom it may concern:*

Be it known that I, B. B. HOTCHKISS, of Sharon, in the county of Litchfield and State of Connecticut, have invented a new and Improved Means of Securing Together the Parts of Snaps for Harness; and I do hereby declare that the following is a full, clear, and exact description of the construction and operation of the same, reference being had to the accompanying drawings, in which—

Figure 1 is a side elevation of a snap ready for the collar to be compressed. Fig. 2 is a side elevation of the fastening collar. Fig. 3 is a transverse section on line S S Fig. 1. Fig. 4 is a transverse section on line S S Fig. 6. Fig. 5 is a view identical with Fig. 3 but showing a slightly different contour of the interior of the collar. Fig. 6 is a side elevation of a snap completed. Fig. 7 is a side elevation of the collar after the compression has been effected. Fig. 8 is a perspective view of a collar before compression. Fig. 9 is a plan view of Fig. 1. Fig. 10 is a section on line T T in Fig. 9. Fig. 11 is a similar section but showing the collar compressed.

My invention applies to any of the convenient fastenings known as snaps whether used for attaching the several parts of harnesses of animals or for attaching chains, cords and the like for any purpose and in every situation.

The methods heretofore in use for connecting the spring to the body of the hook are objectionable both on account of the liability of the connection to become loosened and on account of the weakening of the parts by the holes which were necessary. The punching of any hole through necessarily weakens the spring and increases the expense.

The nature of my invention consists in securing the spring to the hook by the application of a collar with a projection extending in the opposite direction from the spring and which collar is powerfully compressed and the projection thereon bent down by suitable means after the parts are all in place, so that the metal is caused to embrace the spring on every side and the projection is made to extend over the end of the spring and enter the angle of the wire thus rendering it impossible for the spring to work backward or the collar to work forward.

To enable others skilled in the art to make and use my invention I will proceed to describe its construction and operation.

A is the wire which forms the hook the ends being welded as usual at the point.

B is the spring made in the usual tapering form and serving its usual purpose.

C is an oblong collar which slips freely over the point of the hook and is of such size and form as to easily embrace both the hook and the spring in the manner shown in side elevation in Fig. 1 in section in Figs. 3 and 10 and in plan in Fig. 9. The spring B must now be held in its proper position relatively to the hook A and the collar compressed between dies of the form shown in dotted outline by D E in Figs. 4 and 6. These dies change the form of the collar into that represented in side elevation in Figs. 6 and 7 and in section in Figs. 4 and 11. In this portion of the operation four distinct effects are produced. First the metal in what had previously been the straight portion $c$ being by this means bent upward or inward the collar is contracted and made to grasp the inclosed material very tightly. Second the portion $c'$ which had previously been straight on its interior and swelled on its exterior surface being now in a reverse condition bends the metal of the spring to some extent into the cavity between the wires of the hook. Third the compression on the part $c'$ forces the spring B to imprint its shape into the metal above it, or in other words causes the metal of C to fairly embrace and press against the edges as well as the flat faces of the spring B. This is important in preventing any lateral movement of B and it also effectually prevents any end movement of B in the direction toward the point of the hook, because the tapering form of B forbids it under these circumstances. It should be observed that the form of the dies D and E does not allow the collar C to spread itself under the pressure but compels the whole force of the blow or of the pressure to be spent in producing the effects desired. The fourth effect is to bend down the point or projection $c''$. When this point which is a stout spur or overhanging portion formed on the edge of the collar as represented has been struck by the die and bent into the position shown in Figs. 6, 7, and 11 it presses firmly against the end of the spring B and prevents its slipping endwise in the direction from the point of the hook, and also by extending into the eye or what is generally termed "the loop" of the snap, effectually prevents any portion of the work from being displaced in any remaining direction.

My collar C may be of wrought iron, brass or any other material sufficiently soft and strong for the purpose, but I prefer malleable iron. The collars are cast with the projections as shown in Fig. 2 but of greater or less size as may be preferred.

Having now fully described my improved method of securing springs to snaps what I claim as my invention and desire to secure by Letters Patent is—

Securing the spring B to the snap hook A by means of a collar C c″ so constructed and applied as to press against the broad end as well as the faces of the spring substantially in the manner and for the purposes within set forth.

B. B. HOTCHKISS.

Witnesses:
Thomas D. Stetson,
Edwd. A. Magee.